Paul Burger
INVENTOR.

Jan. 29, 1957 P. BURGER 2,779,055
EDGE ROLLING DEVICE
Filed April 29, 1954 8 Sheets-Sheet 5

Paul Burger
INVENTOR.

BY
Attorneys

Jan. 29, 1957 P. BURGER 2,779,055
EDGE ROLLING DEVICE

Filed April 29, 1954 8 Sheets-Sheet 6

Paul Burger
INVENTOR.

BY *Clarence A. O'Brien*
*and Harvey B. Jacobson*
Attorneys

Jan. 29, 1957 P. BURGER 2,779,055
EDGE ROLLING DEVICE
Filed April 29, 1954 8 Sheets-Sheet 7
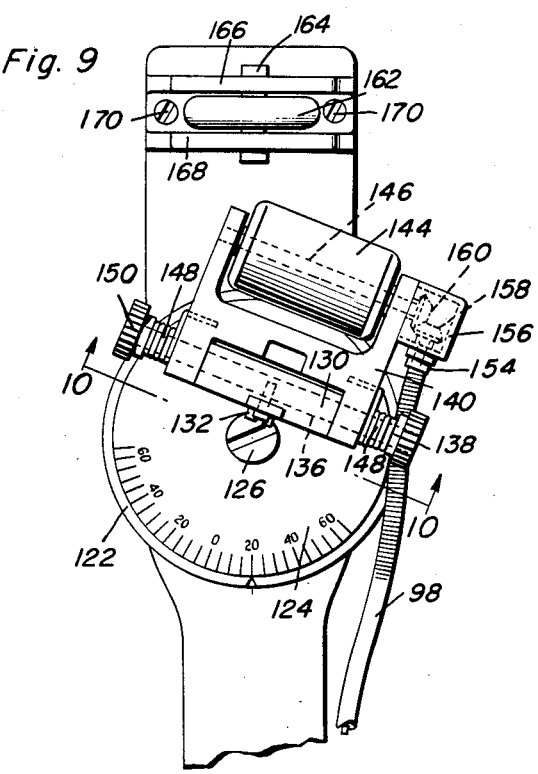
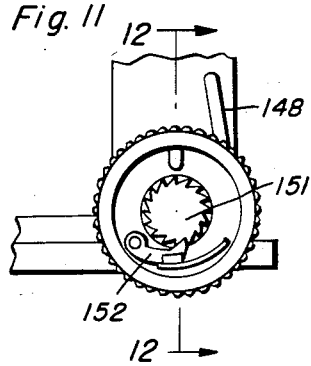
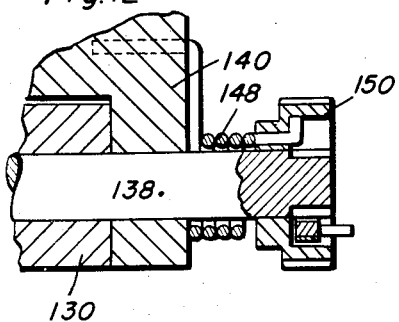
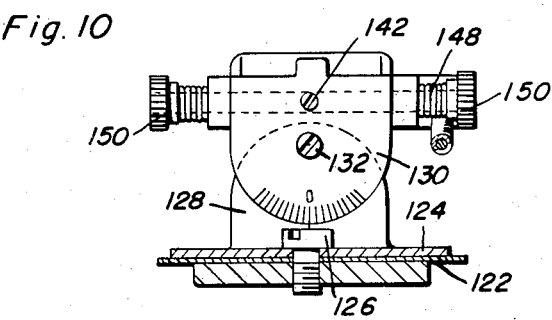
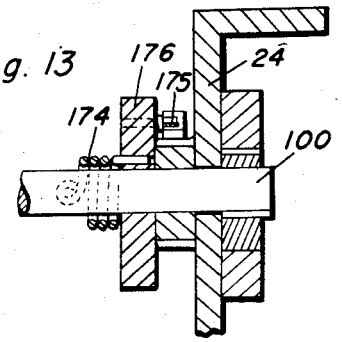
Paul Burger
INVENTOR.

Jan. 29, 1957  P. BURGER  2,779,055
EDGE ROLLING DEVICE
Filed April 29, 1954  8 Sheets-Sheet 8

Paul Burger
INVENTOR.

BY *Clarence A. O'Brien*
*and Harvey B. Jacobson*
Attorneys

United States Patent Office 2,779,055
Patented Jan. 29, 1957

2,779,055

EDGE ROLLING DEVICE

Paul Burger, New Washington, Ohio

Application April 29, 1954, Serial No. 426,361

7 Claims. (Cl. 18—2)

This invention relates to an apparatus for use in molding rubber, latex, neoprene or other like materials so as to enable a rolled edge to be formed on the open end of these products.

The primary object of the present invention resides in the provision of means for automatically rolling the open edge of a dipped product while the product is still on the mold and before the curing thereof.

The device comprising the present invention is especially adapted for use in the making of rubber gloves, balloons, finger stalls and the like, and may be used in conjunction with products having cylindrical forms which are either elliptical or circular in cross-section.

As is well known, many gloves and other products must be scrapped due to the fact that poor rolls are formed at the open ends thereof. Further, in handling forms between the dipping vats and the edge rolling tables in conventional equipment, the molds are likely to become broken. Therefore, the concept of this invention resides in the provision of means for automatically carrying the molds or forms in a carriage and automatically aligning the forms with the edge rolling apparatus. Further, the edge rolling apparatus not only initiates the edge rolling operation, but completes the rolling of the open end of the glove or other product so that it may then readily be taken to the curing ovens.

Still further objects and features of this invention reside in the provision of an edge rolling apparatus which is adapted to reduce the amount of labor necessary in the manufacturing of these products while requiring little maintenance because of substantially fool-proof operation.

These, together with the various ancillary objects and features of the invention which will become apparent as the following description proceeds, are attained by this edge rolling device, a preferred embodiment of which has been illustrated in the accompanying drawings, by way of example only, wherein:

Figure 9 is an enlarged detail view of the roller mounting means;

Figure 10 is a sectional detail view, as taken along the plane of line 10—10 in Figure 9;

Figure 11 is a detail view illustrating the means provided for adjusting the tension on the springs controlling the rollers;

Figure 12 is a sectional detail view, as taken along the plane of line 12—12 in Figure 11;

Figure 13 is a sectional detail view, as taken along the plane of line 13—13 in Figure 5;

Figure 1:
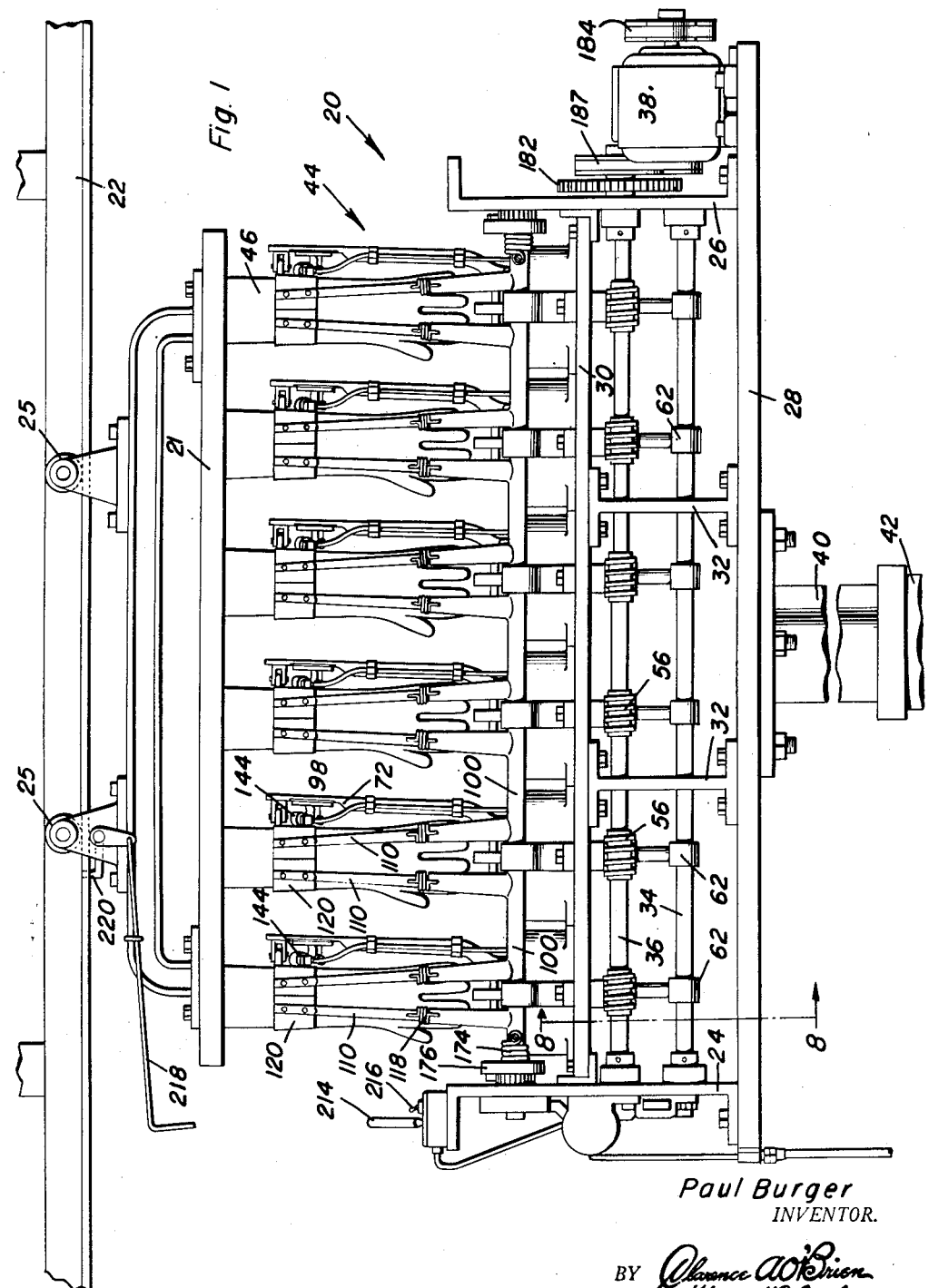
Figure 1 is a side elevational view of the edge rolling apparatus comprising the present invention.

With continuing reference to the accompanying drawings wherein like reference numerals refer to like parts throughout the various views, reference numeral 20 generally designates one of the edge rolling units comprising the present invention. A carriage 21 is provided which is adapted to be suspended from overhead rails, as at 22, on wheels 25 and which is adapted to be moved into alignment with the edge rolling units 20 when conveyed from a dipping vat or other location.

The edge rolling units 20 include, as can be best seen in Figure 1, a pair of end support members 24 and 26 which are mounted on a base 28 and which carry a table 30. A plurality of transverse members 32 are also mounted on the base and aid in supporting the table 30. Journaled in the transverse members 32 as well as in the end members 24 and 26 are shafts 34 and 36.

The shaft 36 is driven by a motor 38 carried by the base 28. The base 28 is mounted on a hydraulic piston 40 which is received in a cylinder 42 which is actuated hydraulically to raise and lower the entire edge rolling unit 20.

It is to be recognized that the edge rolling unit 20 may employ a plurality of edge rolling elements which are generally indicated by reference numeral 44 to provide means for rolling the edges of the work pieces which are coated on forms 46 suspended from the carriage 21 which is carried by the overhead rails 22. It is believed that the construction of the edge rolling elements 44 can be best seen in Figure 4.

Each of the edge rolling elements 44 includes a generally circular base 45 mounted on a flanged bearing 48 set in the table 30. A pinion gear 50 is secured to a sleeve 52 by means of a setscrew 54 and meshes with worm gear 56 keyed as at 58 to the shaft 36. A rod 60 is vertically slidably positioned within the sleeve 52 and is adapted to be lifted by the cam 62 secured to the shaft 34 as by a key 64.

Figure 5:
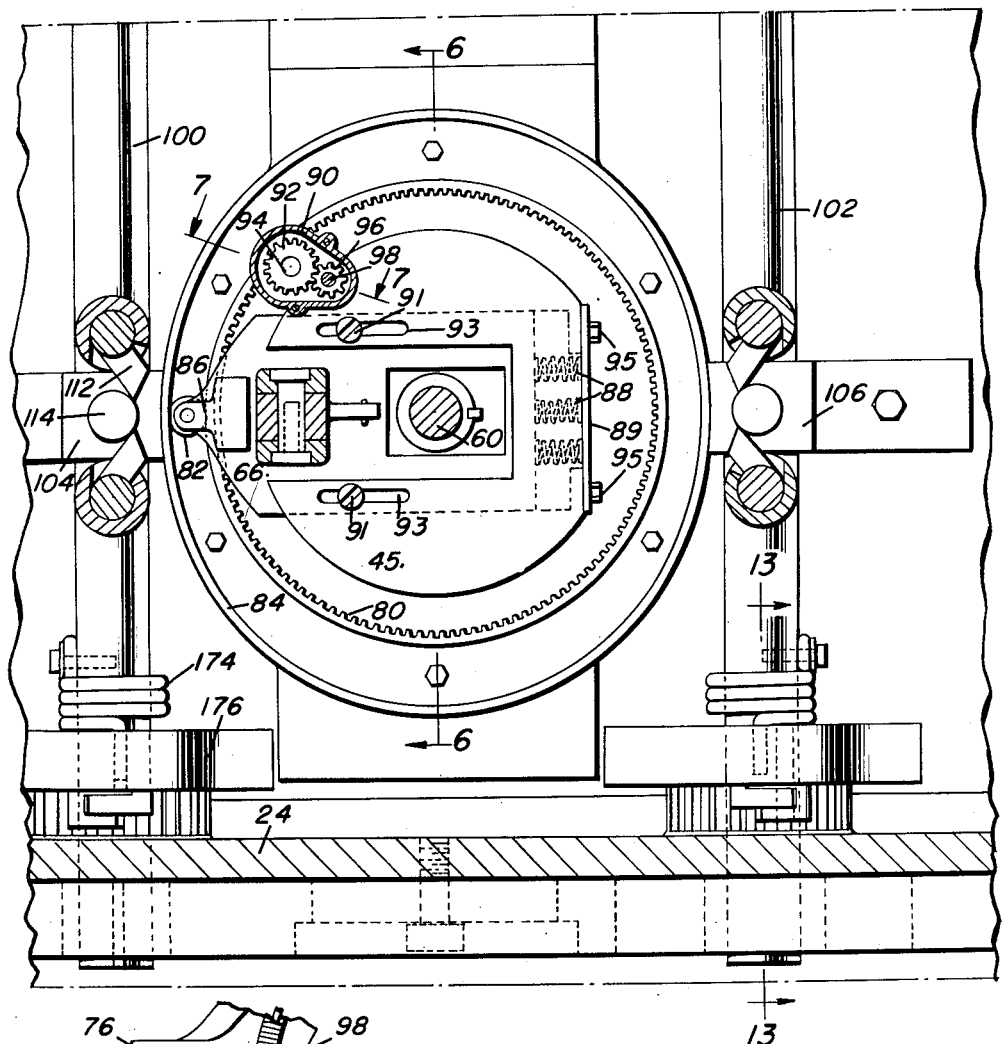
Figure 5 is a horizontal sectional view, as taken along the plane of line 5—5 in Figure 4.
Figure 7:
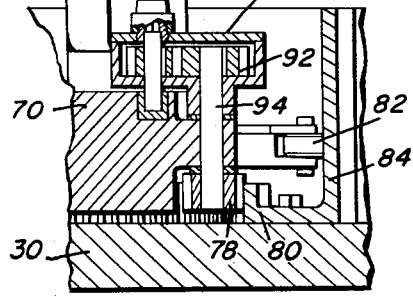
Figure 7 is a sectional detail view illustrating the power transmission means for the flexible cable for actuating a roller.
Figure 6:
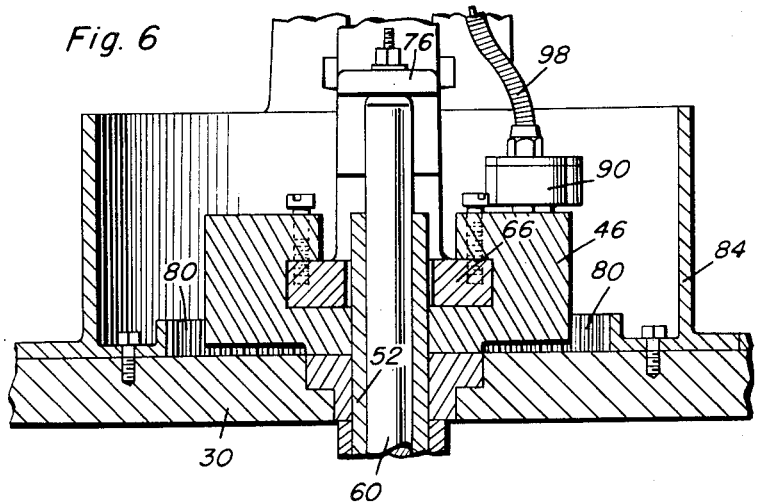
Figure 6 is a vertical sectional view, as taken along the plane of line 6—6 in Figure 5.
Figure 8:
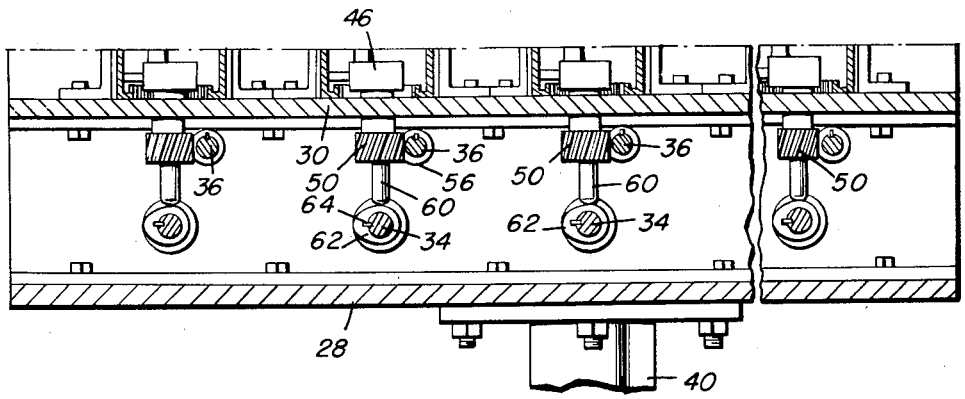
Figure 8 is a sectional detail view illustrating a portion of the actuation mechanism of the invention, as taken along the plane of line 8—8 in Figure 1.

With further reference also to Figure 5, it will be noted that the base 45 is grooved to receive a tongue 66 which is cut out, as at 68, to receive the sleeve 52. The base 70 of the arm 72 is integrally formed with the tongue 66. The arm 72 is hinged to its base 70 by means of a hinge 74. An appendage 76 on the arm 72 is engaged by the rod 60 and is lifted by the rod 60 during the vertical movement of the rod 60 when actuated by the cam 62. The movement of the rod 60 will thus pivot the arm 72 away from the form 46.

A pinion gear 78 is meshed with the stationary gear ring 80. A wheel 82 engages the elliptical curve 84 forming a track and is mounted on the tongue 66 by arms 86 and is held in engagement with the curve by means of spring 88. A gear box 90 is provided in which a gear 92 is mounted on the upper end of a shaft 94 and the gear 92 is meshed with a gear 96 mounted on the lower end of a flexible shaft 98.

A pair of parallel extending shafts 100 and 102 are journaled in the supports 104 and 106. Sleeves 108 in which arms 110 are movable in short horizontal arcs are welded or otherwise secured to the shafts 100 and 102. Fingers 112 are appendages of the arms 110 and bear against cylindrical stops 114. Springs 118 encircle the arms 110 and are terminally secured to the sleeves 108 and the arms 110. Hands 120 are secured to the upper part of the arms 110 and are faced with vertically beaded sponge rubber or the like.

Figure 4:
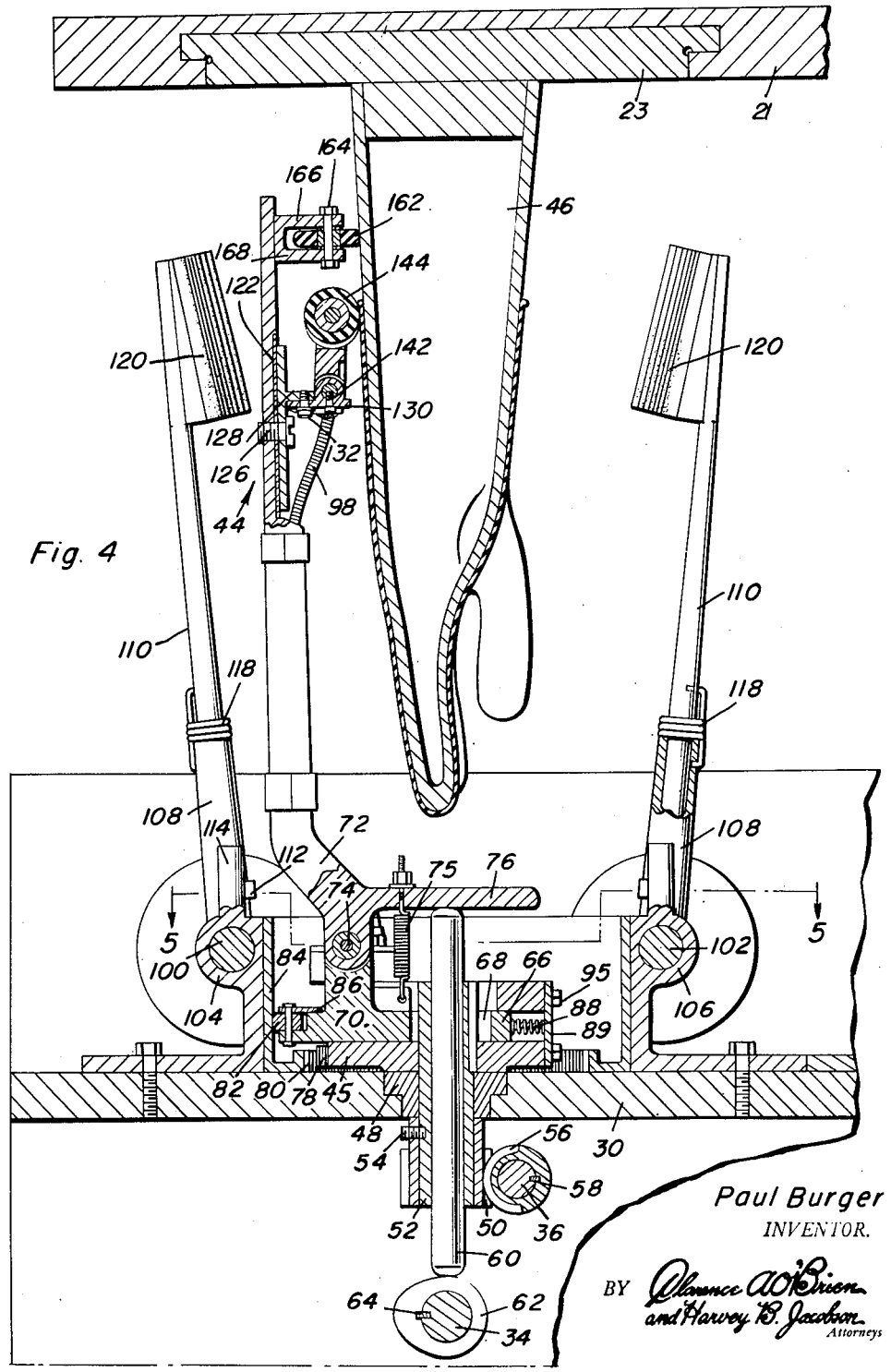
Figure 4 is an enlarged vertical sectional view of the edge rolling elements incorporated in this invention.

The upper portions of the arms 72 are narrow for the purpose of accommodating the roller assembly which can be best seen in Figure 9 as well as in Figure 4.

The roller assembly consists of a circular base 122 rigidly secured to the arm 72. A circular plate 124 which is of slightly smaller size is mounted on the base 122 and secured by any suitable fastener 126. A riser 128 is welded to the plate 124 normal thereto. A further plate 130 having an enlarged upper edge is secured to the riser 128 by means of a fastener 132. The plate 130 is bored as at 136 to receive the pin 138. A clevis 140 having short bottom arms is bored to receive the pins 138 on which the clevis 140 hinges. The pin 138 is locked in the plate 130 by a setscrew 142. Roller 144 is mounted on a shaft 146 which is journaled in bearings inserted in the upper ends of the long arms of the clevis 140. Encircling the pin 138 on both ends are coil springs 148, one end of each of which is secured to the clevis 140 and the other end being secured to adjusting wheels 150 which operate against a ratchet 151 and pawl 152 whose construction can be best seen in Figures 11 and 12.

Bearing 154 is fitted into the side of a gear box 156 and provides means for journaling the flexible shaft 98, the upper end of which is secured to a pinion gear 158 which meshes with another gear 160 within the gear box 156. The gear 160 is secured to the end of the shaft 146.

The carriage wheel 162 is mounted on the shaft 164 which is journaled in bearings between the bifurcations 166 and 168 extending normal to the arm 72 and which are held in place by means of fasteners 170.

As can be seen best in Figures 1 and 5, the parallel shafts 100 and 102 extend the entire length of the machine. As can be seen best in Figure 2, which is a view normal to that of Figure 1, keyed to the front ends of the shafts 100 and 102 are cams 172 journaled in suitable bearings in the back side of the side member 24. Coil springs 174 each having one end secured to the shafts 100 and 102 and the other secured to adjusting wheels 176 which operate against a pawl and ratchet arrangement 175 are secured about the shafts 100 and 102. The other ends of the shafts 100 and 102 are likewise mounted.

Figure 3:
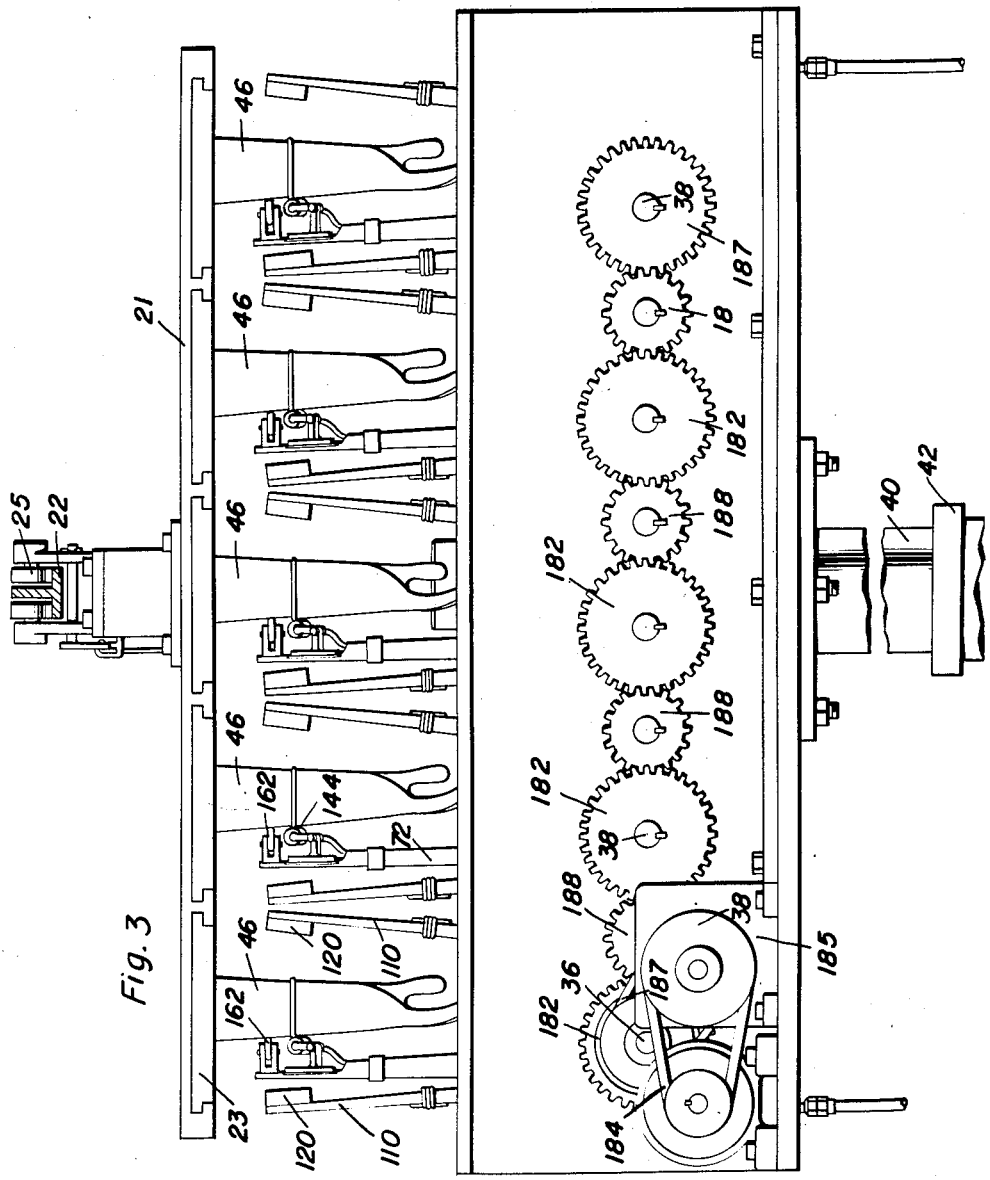
Figure 3 is another end elevational view of the apparatus looking from the other end of the machine from that of the view shown in Figure 2.

The shaft 36 likewise extends the entire length of the edge rolling unit 30. The front end of the shaft 36 is journaled in the end support member 24. The shaft 36 is further journaled in the end member 26 and has a gear 182 secured thereto by a setscrew or other suitable means. The shaft 36 as well as the gear 182 are driven by means of the motor 38 through a pulley arrangement 184. The various shafts 36 in the series of shafts 36 have other gears 182 secured thereto, as can be best seen in Figure 3, and each of the gears 182 is interengaged by means of suitable gears 188.

Figure 2:
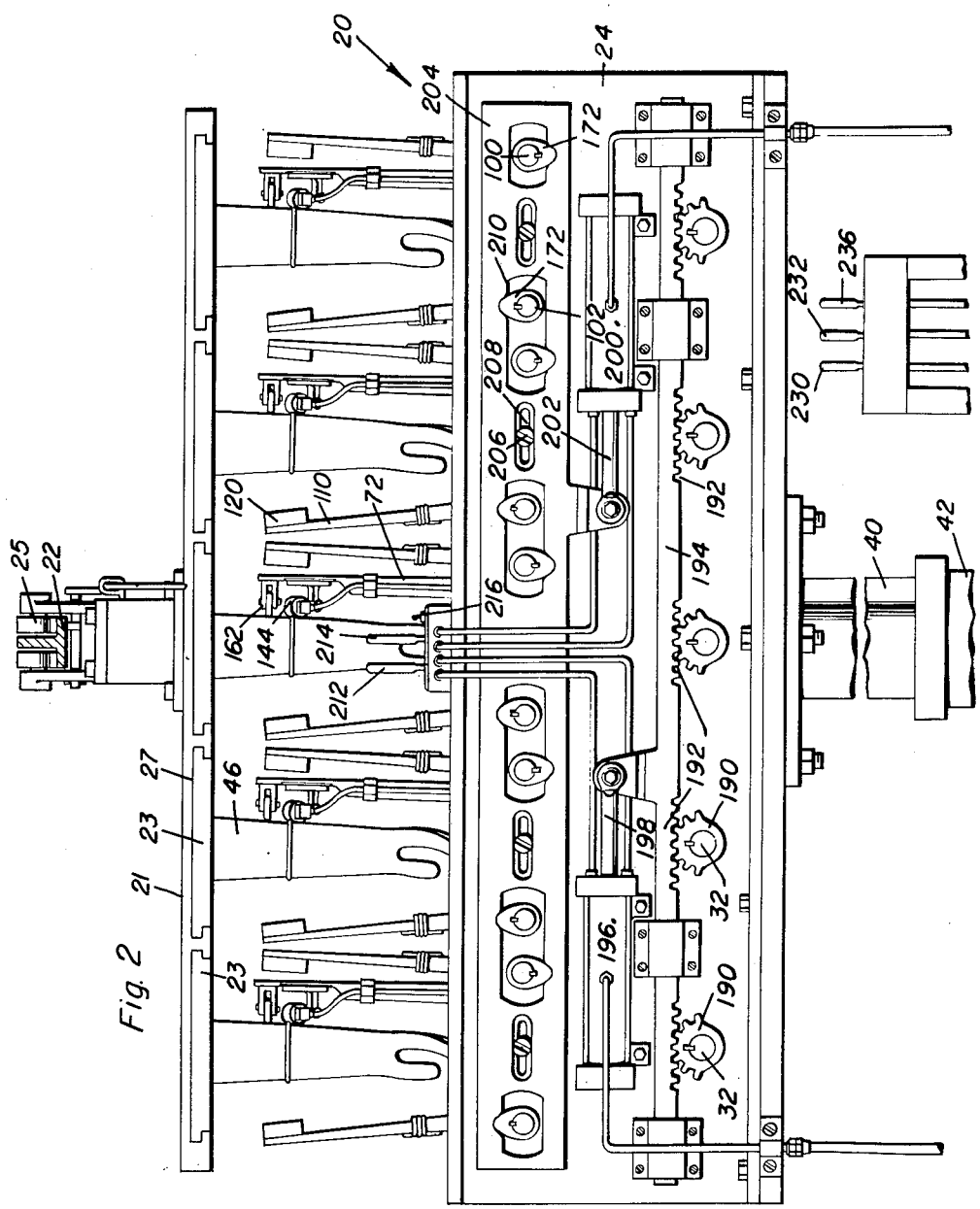
Figure 2 is an end elevational view of the device looking in a plane normal to the plane of Figure 1.

As is seen best in Figure 2, half gears 190 are keyed at the front ends of shafts 34 and the half gears 190 engage teeth 192 on a bar 194 operated by means of hydraulic cylinder 196 which actuates a piston 198 pivotally attached to the bar 194.

Another hydraulic cylinder 200 actuates a piston rod 202 which further actuates a control bar 204 carried by the side member 24 by means of fasteners 206 which extend through slots 208 in the control bar 204. The control bar 204 is provided with eccentric openings 210 therein within which the cams 172 work. The cylinders 196 and 200 are interconnected by suitable hydraulic lines to operating control members 212 and 214 mounted on the upper portions of the edge rolling units 20. A switch 216 is, of course, provided for controlling the operation of the motor 38.

It is to be noted that the carriage 21 has a plurality of suitable undercut recesses 27 therein for reception of the slides 23 on which the forms 46 are suspended. Further, the carriage 21 is suspended from the carriage rail 22 by means of rollers or wheels 25 carried thereby. As can be best seen in Figure 1, an operating mechanism including an operating rod 218 which is adapted to actuate a latch 220 is provided for both moving the carriage 21 along the track 22 and for locking it in a selected position in alignment with the edge rolling unit 20.

The operation of this apparatus is a comparatively complex synchronous movement of parts. With the edge rolling unit 20 lowered out of operative position utilizing the hydraulic lift comprising the piston 40 and cylinder 42, the carriage 21 may be moved into position and latched in place. The forms 46 have the row of gloves thereon which are to be rolled as a result of a previous dipping action. With the arms 110 as well as the arm 72 in a non-operative position, the edge rolling unit is then raised to an operating level by utilizing a suitable control member 230, Figure 2, mounted in any suitable position adjacent the edge rolling unit 20. This will then position the roller 144 as well as the carriage wheel 162 in an operating position against the forms 46, by previously pushing the control lever 212 forward which moves the piston rod 198 and the bar 194 to the left turning the half gears 190 and thus the shafts 32 counterclockwise. The cams 62 likewise turn counter-clockwise permitting the spring 75, as in Figure 4, to urge the arm 72 downwardly due to the lower position of the plunger 60. Then, the switch 216 may be thrown to an "on" position, actuating the motor 30 so that power may be transmitted from the motor 36 by the belt arrangement 184 through gear reducing box 185 and belt 187 to drive the gears 182 and the idler gears 188. This actuates the shafts 36 to drive the worm gears 56 which, in turn, drive the pinion gear 50 and the sleeves 52, and thus the base 46 which is secured to the sleeve 52. Simultaneously, pinion gear 78 secured to the bottom of the flexible cable 98 and meshed with the stationary ring gear 80 turns, causing the gear 158, Figure 9, to drive the roller 144. Simultaneously, the wheel 82 moves around the elliptical curve 84 and is held thereby by tension of the spring 88. Thus, it will be seen that the arm 40 will travel in an elliptical orbit which is the path that the roller 144 will travel around the form 46 so as to rotate the roller 144 about the upper edge of the glove to be rolled.

Since the spring 75 presses the carriage wheel 162 against the form 46 with slightly greater tension than the springs 148, Figure 9, press the roller 144 against the form 46 and the glove thereon, danger of chatter or skipping is eliminated. Of course, the tension of all of the springs is adjustable.

Since the plate 130, Figures 9 and 10, can be moved to give the roller 144 horizontal adjustment, and disk 124 can be moved to give the roller 144 vertical adjustment, the position of the roller 44 against the glove on the form 46 can be adjusted. The roller 144 may be made from cork, sponge rubber, combination cork and rubber or bristle or fiber brush, as may be found desirable.

Figure 14:
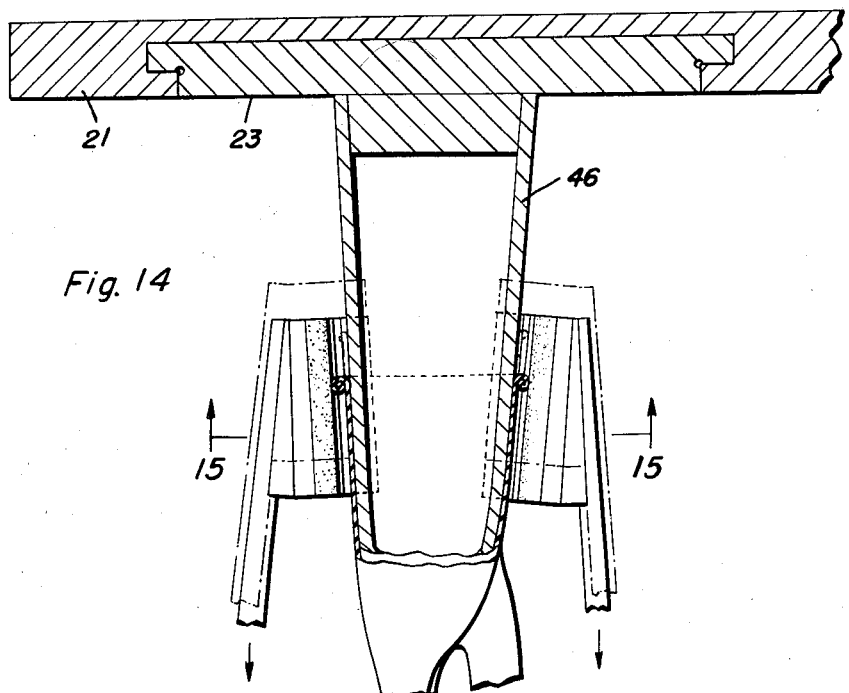
Figure 14 is an enlarged sectional detail view illustrating the construction of the forms and slides which are adapted to seat in the carriage.
Figure 15:
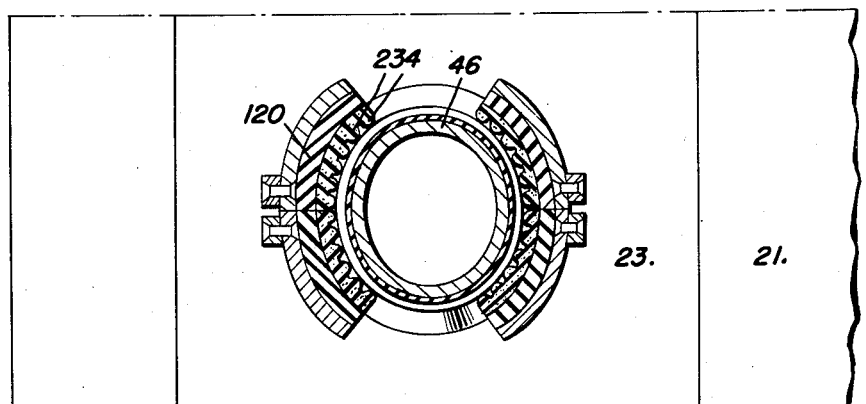
Figure 15 is a horizontal sectional view, as taken along the plane of line 15—15 of Figure 14 illustrating the construction of the hands.
Figure 16:
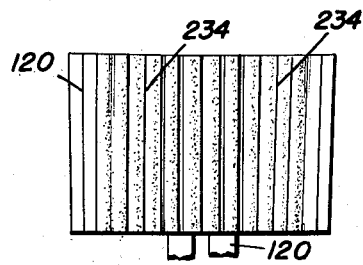
Figure 16 is an elevational view of the hands.

As the arm 72 travels about the form 46, the roller 144 spins in a consistently horizontal path at the upper edge of the glove. The angle, preferably 20°, at which the roller 144 is tilted allows the fore part of the roller 144 to loosen the glove edge from the form 46 and the after part of the roller 144 to roll the edge of the glove. After the roller 144 has completed a circuit around the form 46, the glove edge is precisely but thinly rolled. Now, the switch lever 216 is thrown to an "off" position, stopping the motor 38 and consequently all further movements of the arm 72. Then, the control lever 212 is pulled back, moving the arm 72 back to a non-operative position by reverse movement of the apparatus previously described. Then, control lever 214 is actuated, moving the hands 120 into an operative position. This is accomplished as follows: Upon actuation of the control 214, the piston rod 202 causes the control panel 204 to move to the right, causing the shafts 100 having the cams 172 pointing down to turn counter-clockwise and causing shafts 102 having cams 172 pointing upward to turn clockwise. This can be best seen in Figure 2. This causes the sleeves 108 containing arms 110 to move out of alignment with the stops 114. As the disalignment increases, tension of springs 118 forces the fingers 112 against the stop 114, so that when the arms 110 are holding the hands 120 in an operative position, the fingers 112 will have lost contact with the stop 114 and the spring 118 will continue to twist the arms 110 so that the finger ends of the hands 120 will press against the form 46 with desired tension. Further, as can be seen in Figure 1, the springs 174 will hold the hands 120 generally against the forms 46. Then, control lever 232, Figure 2, is actuated to permit the hydraulic lift to slowly descend, causing the hands 120 with their soft rubber ribs 234, as can be best seen in Figures 14 and 15, to press the started roll to move downward, advancing the roll to the desired stage. Then, the control lever 232 is pushed to the other position, stopping the descent of the hydraulic lift. Next, control lever 214 is again actuated, causing the hands 120 to move back into a non-operative position. Then, the machine is lowered completely out of an operative position, utilizing a fast travel control lever 236 which further controls the hydraulic cylinder 42. Then, the rods 218 may be moved, releasing the latch 220 so that the carriage 21 may be moved out of alignment with the edge rolling apparatus 20 and into a curing oven.

While the foregoing description relates to gloves or the like that are processed on elliptical-shaped forms, it is possible to adapt this machine in a simple manner so that it may be utilized in the processing of rubber gloves, balloons and the like dipped on cylindrical forms which also require a rolled edge.

In adapting this apparatus for use with cylindrical forms, the wheel 82 and arms 86 are removed from the tongue 66. The end plate 89 as well as springs 88 is removed from the base 45, after which the plate 89 is then replaced. Flange-headed setscrews 91 are inserted through slots 93 and after the tongue 66 has been moved to a position to give the desired radius to provide a circular orbit for the arm 72, the screws 91 are tightened securely, rendering the tongue 66 immovable. It is noted that the plate 89 is held in place by suitable bolts or fasteners 95.

Hands designed to conform to the shape of cylindrical forms are utilized in lieu of the hands 120 which are, of course, especially adapted for use with elliptical forms.

For small products, like toy balloons, finger stalls and the like, there would obviously be required no change of design or structure, but the apparatus would be scaled down in size commensurate with the object to be produced.

In adapting this device for use in cleaning forms, it is possible to provide a stiff bristle or fiber brush incorporated in lieu of the roller 144 and set normal to the horizontal so that the forms may be readily scrubbed. Further, when used permanently as a form cleaning machine, this apparatus may be simplified by elimination of various elements thereoef.

From the foregoing, the construction and operation of the device will be readily understood and further elplanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An edge rolling apparatus comprising at least one form, a table beneath said form, a base mounted for rotation in said table, means for rotating said base, an arm carried by said base, a roller mounted on said arm for engagement with material on said form, a pair of hand supporting arms pivotally mounted on said table, and means for rocking said pair of hand supporting arms toward and away from each other, said hand supporting arms carrying hands engageable with material on said form.

2. An edge rolling apparatus comprising a rail, a carriage movable on said rail, at least one form suspended from said carriage, a table beneath said rail, means for raising and lowering said table, a base mounted for rotation in said table, means for rotating said base, an arm carried by said base, a roller mounted on said arm for engagement with material on said form; said means for rotating said base including guide means for moving said arm to conform to the contours of said form, said means for rotating said base rotating said roller, a pair of hand supporting arms pivotally mounted on said table, and means for rocking said pair of hand supporting arms toward and away from each other, said hand supporting arms carrying hands engageable with material on said form.

3. An edge rolling apparatus comprising a rail, a carriage movable on said rail, at least one form suspended from said carriage, a table beneath said rail, means for raising and lowering said table, a base mounted for rotation in said table, means for rotating said base, an arm carried by said base, a roller mounted on said arm, and means for tilting said arm towards and away from said form with said roller being engageable with material on said form, said means for rotating said base including guide means for moving said arm to conform to the contours of said form, said means for rotating said base rotating said roller, a pair of hand supporting arms pivotally mounted on said table, and means for rocking said pair of hand supporting arms toward and away from each other, said hand supporting arms carrying hands engageable with material on said form.

4. An edge rolling apparatus comprising a rail, a carriage movable on said rail, at least one form suspended from said carriage, a table beneath said rail, means for raising and lowering said table, a base mounted for rotation in said table, means for rotating said base, an arm carried by said base, a roller mounted on said arm with said roller being engageable with a work piece on said form, a pair of hand supporting arms pivotally mounted on said table, said hand supporting arms being mounted on shafts, cams on said shafts, a control panel carried by said table, eccentric apertures in said control panel, said cams being seated in said apertures, and hydraulic means for moving said control panel to rotate said shafts to rock said hand supporting arms toward and away from each other, said hand supporting arms carrying hands engageable with material on said form.

5. An edge rolling apparatus comprising a rail, a carriage movable on said rail, at least one form suspended from said carriage, a table beneath said rail, means for raising and lowering said table, a base mounted for rotation in said table, means for rotating said base, an arm carried by said base, a roller mounted on said arm with said roller being engageable with a work piece on said form, a pair of hand supporting arms pivotally mounted on said table, said hand supporting arms being mounted on shafts, cams on said shafts, a control panel carried by said table, eccentric apertures in said control panel, said cams being seated in said apertures, and hydraulic means for moving said control panel to rotate said shafts to rock said hand supporting arms toward and away from each other, said hand supporting arms carrying hands engageable with material on said form, said means for rotating said base including guide means for moving said arm to conform to the contours of said form.

6. An edge rolling apparatus comprising a rail, a carriage movable on said rail, at least one form suspended from said carriage, a table beneath said rail, means for raising and lowering said table, a base mounted for rotation in said table, means for rotating said base, an arm carried by said base, a roller mounted on said arm with said roller being engageable with a work piece on said form, a pair of hand supporting arms pivotally mounted on said table, said hand supporting arms being mounted on shafts, cams on said shafts, a control panel carried by said table, eccentric apertures in said control panel, said cams being seated in said apertures, and hydraulic means for moving said control panel to rotate said shafts to rock said hand supporting arms toward and away from each other, said hand supporting arms carrying hands engageable with material on said form, said means for rotating said base including guide means for moving said arm to conform to the contours of said form, and means for tilting said arm toward and away from said form.

7. An edge rolling apparatus comprising a rail, a carriage movable on said rail, at least one form suspended from said carriage, a table beneath said rail, a base mounted for rotation in said table, means for rotating said base, an arm carried by said base, a roller mounted on said arm with said roller bearing engageable with material on said form, said means for rotating said base rotating said roller, a pair of hand supporting arms pivotally mounted on said table, and means for rocking said pair of hand supporting arms toward and away from each other, said hand supporting arms carrying hands engageable with material on said form.

References Cited in the file of this patent

UNITED STATES PATENTS

| | | |
|---|---|---|
| 1,818,792 | Coovert et al. | Aug. 11, 1931 |
| 2,067,641 | Millen | Jan. 12, 1937 |